United States Patent [19]

Vallauri et al.

[11] Patent Number: 5,223,190
[45] Date of Patent: Jun. 29, 1993

[54] APPARATUS AND METHOD TO MAKE COMPOSITE INSULATORS FOR ELECTRIC OVERHEAD LINES

[75] Inventors: Ubaldo Vallauri, Monza; Francesco Portas, Quattordio, both of Italy

[73] Assignee: Pirelli Cavi S.p.A., Milan, Italy

[21] Appl. No.: 827,454

[22] Filed: Jan. 29, 1992

[30] Foreign Application Priority Data

Feb. 1, 1991 [IT] Italy .............. M191A000261
Feb. 1, 1991 [IT] Italy .............. M191A000260

[51] Int. Cl.$^5$ .............................. B29C 45/80
[52] U.S. Cl. .................. 264/40.1; 264/264; 264/272.15; 264/278; 264/279; 264/318; 425/111; 425/118; 425/150
[58] Field of Search .......... 264/40.1, 264, 272.11, 264/272.13, 272.15, 275, 278, 279, 318; 425/111, 116, 135, 149, 150, 171; 249/85, 91, 93, 94, 95

[56] References Cited

U.S. PATENT DOCUMENTS

| | | |
|---|---|---|
| 2,197,465 | 4/1940 | Brunetti . |
| 3,109,201 | 11/1963 | Dulmage ............ 264/275 |
| 3,380,120 | 4/1968 | Rowland et al. ...... 425/577 |
| 3,385,553 | 5/1968 | Braun ............... 425/577 |
| 4,318,879 | 3/1982 | Gartner . |

FOREIGN PATENT DOCUMENTS

| | | |
|---|---|---|
| 0030931 | 6/1981 | European Pat. Off. . |
| 0120787 | 10/1984 | European Pat. Off. . |
| 2079455 | 11/1971 | France . |
| 2399105 | 2/1979 | France . |
| 2637697 | 10/1989 | France . |
| 1601379 | 10/1981 | United Kingdom . |

OTHER PUBLICATIONS

Conference Internationale Sur Les Grandes Reseaux Electriques (Cigre) 1978 15-10, 1980 22-10 and 22-11, 1986 15-12, 1988 15-17 L'Energia Elettrica No. 1, 1983—pp. 36-46.

Lignes Aeriennes: Cables, Conducteurs, Isolateurs et Accessoires journees d'etudes Mar. 21, 1990.

Le Linee Elettriche, La Normativa, La Relazione Con L'Ambiente, GLI Sviluppi Tecnologici giornate di studio Nov. 15, 1988.

*Primary Examiner*—Jill L. Heitbrink
*Attorney, Agent, or Firm*—Brooks Haidt Haffner & Delahunty

[57] ABSTRACT

A process and an apparatus to make composite insulators, consisting of a central core (3) provided with an insulating coating (4) of elastomeric material, for electric overhead lines. The apparatus comprises a base structure (6) to which a first and a second end pieces (5a, 5b) of the core (3) are respectively fastened by a bracket (7a), and two injection mould halves (8a) designed to be moved close to each other. Mounted to the base structure (6) are at least two forming mould halves (9a, 9b) arranged to define a filling housing (9c) around the core (3). An injection nozzle (11) communicates with a conveying hollow space (12) coaxial with the central core (3), which is formed between the injection mould halves (8a) and a containing sleeve (13) mounted on the second end piece (5b). The conveying hollow space (12) is directly in communication with the filling housing (9c) so that the injection flow of the elastomeric material takes place in an axial direction relative to the central core (3), which will avoid side bendings of the central core itself. The process includes the use of a load cell (24) and a fluid-operated actuator (25) operate between the bracket (7a) and base structure (6) for applying a mechanical tractive action to the central core (3), adapted to counteract the core deflection by effect of anomalous thrusts exerted by the elastomeric material during the injection step.

28 Claims, 6 Drawing Sheets

APPARATUS AND METHOD TO MAKE COMPOSITE INSULATORS FOR ELECTRIC OVERHEAD LINES

BACKGROUND OF THE INVENTION

1. Field of the Invention

The present invention relates to an apparatus and method to make composite insulators for electric overhead lines.

2. Description of

It is known that in electric overhead transmission lines, the electric conductors are engaged with respective supporting pylons after interposing appropriate insulators.

A so-called "composite" insulator has been widely used in recent years.

Insulators of this kind are described, for example, in the minutes of the "CONFERENCE INTERNATIONALE SUR LES GRANDES RESEAUX ELECTRIQUES" (CIGRE), 1978 15-10, 1980 22-10 and 22-11, 1986 15-12, 1988 15-07; composite insulators are also described in the review "L'ENERGIA ELECTRICA", No. 1, 1983, pages 36-46.

Generally, composite insulators are mainly comprised of a cylindrical central core of elongated form made of a composite material reinforced with fibre glass or the like, and an outer insulating coating of elastomeric material, and are provided on the outer surface thereof with a plurality of uniformly-distributed annular projections which extend in coaxial relation with the central core. In general, the central core has the function of withstanding the mechanical stresses transmitted from the conductor to the pylon, whereas the protecting coating substantially aims at protecting the central core from external agents and preventing possible discharges between the conductor and the pylon.

According to one of the known methods for the achievement of composite insulators, as disclosed in CIGRE 1980, 22-11, page 3, and also described in the French Patent Application No. 2 399 105, the central core is coated with a cylindrical protection sheath, to which the annular projections moulded separately and generally made of the same materials forming the sheath, are applied.

According to a further known method, composite insulators are made by the injection moulding technique.

This technique enables the outer coating together with the respective annular projections to be directly formed on the central core by a single moulding and cross-linking step.

This technique is described for example in the European Patent Application No. 0 120 787 and also in the already mentioned French Patent Application No. 2 399 105.

In greater detail, the central core is enclosed between two movable half-moulds defining a filling housing the shape of which conforms to the shape of the outer coating provided with the annular projections.

Subsequently, elastomeric material in a plastic state is injected into said housing, radially to the central core, in order to carry out the complete filling of the housing. Then, the elastomeric material forming the outer coating and the annular expansions is subjected to cross-linking.

Ultimately, the mould halves are moved apart from each other in order to enable the finished insulator to be withdrawn therefrom.

In the European Patent No. 0 120 787, the presence of supporting rods is provided which are held in contact with the central core during the injection step in order to avoid central core bending as a result of the thrust exerted by the elastomeric material. These rods are retracted at the end of the injection step and before the cross-linking of the polymeric coating.

In accordance with a further method used for the manufacture of said insulators, the outer coating is first made in two separate halves by injection moulding, each half being provided with a semi-cylindrical housing designed to receive the central core. This is achieved by interposing an intermediate plate between two mould halves each reproducing the outer shape of the respective half, said plate being provided, on opposite sides, with semicylindrical projections each reproducing the shape of one half of the central core. Afterwards both mould halves are filled with elastomeric material and before the material cross-linking takes place, the mould halves are opened and the intermediate plate is moved away.

At this point the mould halves are moved close to each other again, upon interposition of the central core therebetween, and the insulator halves formed at the inside of the mould halves are therefore joined together.

When the cross-linking has been completed, the two insulator halves will be firmly joined to each other and to the central core.

SUMMARY OF THE INVENTION

In accordance with a first aspect of the present invention, the complete absence of undesired side bendings of the central core is ensured by carrying out the injection of the elastomeric material in the filling housing according to a direction coaxial to the core itself.

In particular, the invention relates to an apparatus to make composite insulators for electric overhead lines, in which each of said insulators comprises a central core of composite material exhibiting, at opposite ends, a first and a second end pieces, as well as a core coating made of elastomeric material provided with longitudinally-distributed annular projections disposed in coaxial relation with the core, said apparatus comprising: a base structure; first clamping means to engage and support said first end piece; second clamping means to engage the second end piece; at least two forming mould halves, slidably guided relative to the base structure and movable between an open position in which they are spaced apart from each other and a closed position in which they define a filling housing around the core, the shape of which matches the outer shape of said insulator, characterized in that it comprises injection means for introducing an amount of elastomeric material into said filling housing, which means consists of passages extending in an axially symmetrical direction parallel to the axis of the central core for feeding the elastomeric material onto said central core.

Preferably, said injection means comprises an injection nozzle fed with said elastomeric material and communicating with a conveying hollow space defined between said second clamping means and a containing sleeve coaxially fastened to the second end piece and adapted to be firmly engaged by said second clamping means, said hollow space being disposed coaxially to the central core and communicating with the filling housing provided in the forming moulds.

A further preferential feature of the invention is that the containing sleeve has an annular flange radially protruding towards the outside of the sleeve and designed to be engaged by said second clamping means in order to cause the fastening of the sleeve and the second end piece, said flange exhibiting circumferentially-distributed through openings to bring the conveying hollow space into communication with the filling housing.

Said sleeve also comprises: a cylindrical body housing the second end piece and designed for engagement by the second clamping means, said end piece exhibiting an annular shoulder designed to come in abutment against an inlet of the cylindrical body; a pointed closure piece or ogive to be coaxially engaged to the end of the cylindrical body opposite the inlet; an threaded member having one head operatively engaged to the second end piece and a threaded shank operatively engaged to the ogive so as to lock the annular shoulder against the inlet of the cylindrical body and the ogive against the end of the cylindrical body.

Provision is also made for a threaded stop ring operatively engaged with said threaded shank and acting on the second end piece so as to lock said head into an undercut housing offered by the end piece itself.

Preferably, associated with the cylindrical body inlet, is a sealing ring designed to act by contact on the annular shoulder of the second end piece so as to sealingly close said inlet.

According to further preferential features of the invention, the first clamping means comprises a support bracket designed to engage the first end piece of said central core, whereas the second clamping means comprises at least two injection mould halves movable between an open position in which they are spaced apart from each other and a closed position in which they are located close to each other in order to fix the positioning of the second end piece.

A further feature of the invention also consists in that the injection nozzle is connected to the conveying hollow space by at least a canalization defined in the second clamping means.

Preferably, said canalization, or canalizations, have at least a portion contiguous to the hollow space axially symmetrical to, and in coaxial relation with the axis of the central core.

In accordance with another preferred aspect of the present invention, the complete absence of undesired side bendings of the central core is further ensured by applying a mechanical tensile action to the latter should a tension variation of the core itself occur during the elastomeric material injection step.

In particular, according to this aspect, the present invention provides an apparatus to make composite insulators for electric overhead lines, in which each of said insulators comprises a central core made of composite material, provided with an outer coating of elastomeric material and exhibiting a first and a second end pieces associated with a first and a second end respectively of said core and externally projecting from the coating of elastomeric material, said apparatus being of the type comprising:
  a base structure;
  first clamping means to engage and support said end piece;
  at least two forming mould halves, slidably guided relative to the base structure and movable between an open position in which they are spaced apart from each other and a closed position in which they define a filling housing around the core, the shape of which matches the outer shape of said insulator coating;
  injection means designed to introduce an amount of elastomeric material to the plastic state into said filling housing, in order to carry out the complete filling of said housing, characterized in that it further comprises:
  metering means connected in series between the central core and the base structure, adapted to detect possible variations in the axial tensile state of the core;
  tension means axially acting on the central core and adapted to apply a mechanical tensile action to said central core;
  drive and control means acting on said tension means in combination with the metering means and adapted to control the operation of the tension means in response to the detection of said variations in the axial tensile state of the core.

In greater detail, said tension means comprises a fluid-operated actuator engaged to the base structure and acting on the first clamping means.

Said metering means in turn comprises a load cell operatively disposed between the first clamping means and said fluid-operated actuator.

Said first clamping means comprises a bracket having a fork-shaped portion into which the first end piece of the central core is engaged; said second clamping means comprises at least two injection mould halves movable between an open position in which they are spaced apart from each other and a closed position in which they are disposed close to each other in order to fix the positioning of the second end piece of the central core.

Said drive and control means comprises an automatic processing unit adapted to operate the application of a tensile load to the core the value of which corresponds to the detected variation in the tensile state of the core itself, based on a predetermined correlation.

In a further aspect, the invention relates to a process to make composite insulators for electric overhead lines, in which each of said insulators comprises a central core of composite material provided with an outer coating of elastomeric material and exhibiting a first and a second end pieces associated with a first and a second end of said core and externally protruding from the coating of elastomeric material, said process being of the type comprising the following steps:
  supporting the central core snugly by the engagement of said first and second end pieces;
  enclosing said core between at least two forming mould halves movable between an open position in which they are spaced apart from each other and a closed position in which they define a filling housing around the core the shape of which conforms to the shape of the outer insulator coating;
  injecting an amount of elastomeric material to the plastic state into said filling housing in order to cause the complete filling of said housing;
  causing the cross-linking of the elastomeric material introduced into said forming mould halves;
  moving said forming mould halves away from the insulator bringing them from the closed position to the open position, characterized in that during the injection step and before the cross-linking step, the following further steps are provided:

detecting possible variations in the axial tension of the central core as a result of deformations of the core itself, due to side deflection;

applying an additional tensile load of a predetermined value to the core each time one of said tension variations occurs.

In particular, the process of the invention before the injection step comprises a starting pretensioning step carried out on the central core the load of which is at least adapted to reduce the mounting plays to zero.

In one embodiment the additional tensile load is maintained as far as the tensile value resulting therefrom becomes steady to a constant value at least over a predetermined time; alternatively, the additional tensile load remains for a predetermined time, or lasts until the end of the injection step of the elastomeric material forming the outer insulator coating.

The additional tensile load is lower than a value equal to 1/10 of the ultimate tensile stress of the core and preferably lower than a value corresponding to an elongation of 1 per thousand of the core itself.

The maximum additional tensile load applied to the core is included between 5 and 10 times the absolute value of the detected variation in the axial tension.

Conveniently the additional tensile load is substantially reduced to zero before the beginning of the cross-linking step, and an overall residual tensile load lower than a value equal to 1/20 of the tensile stress of the core and preferably lower than a value corresponding to an elongation of 0.5 per thousand of the core is maintained in the core during the cross-linking step.

BRIEF DESCRIPTION OF THE DRAWINGS

Further features and advantages will become more apparent from the following detailed description of a preferred embodiment of an apparatus to make composite insulators for electric overhead lines in accordance with the present invention, given hereinafter by way of non-limiting example with reference to the accompanying drawings, in which.

DESCRIPTION OF PREFERRED EMBODIMENTS

Figure 1:
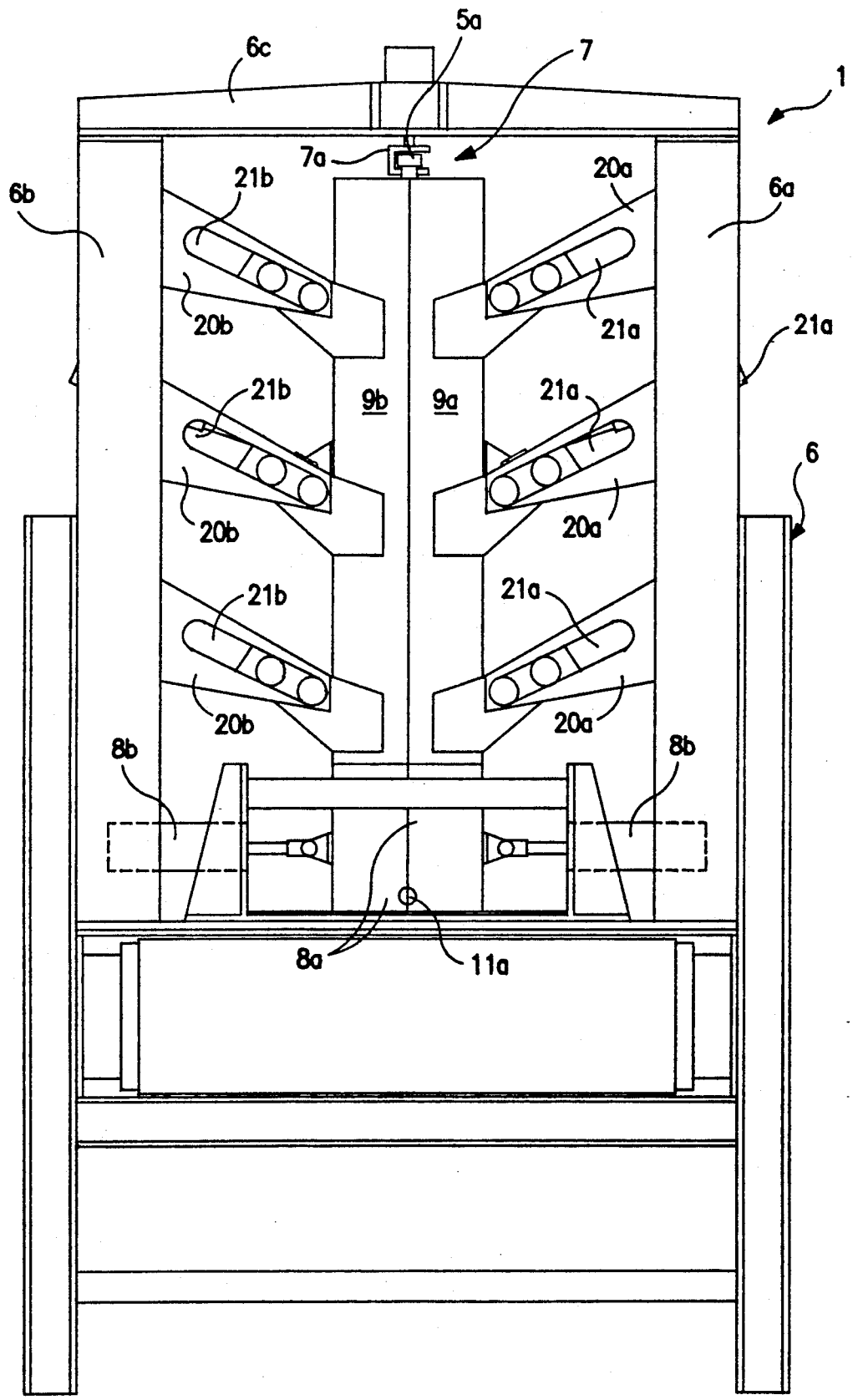
FIG. 1 is a front view of a moulding apparatus in accordance with the invention, showing the mould halves in the closed position.
Figure 2:
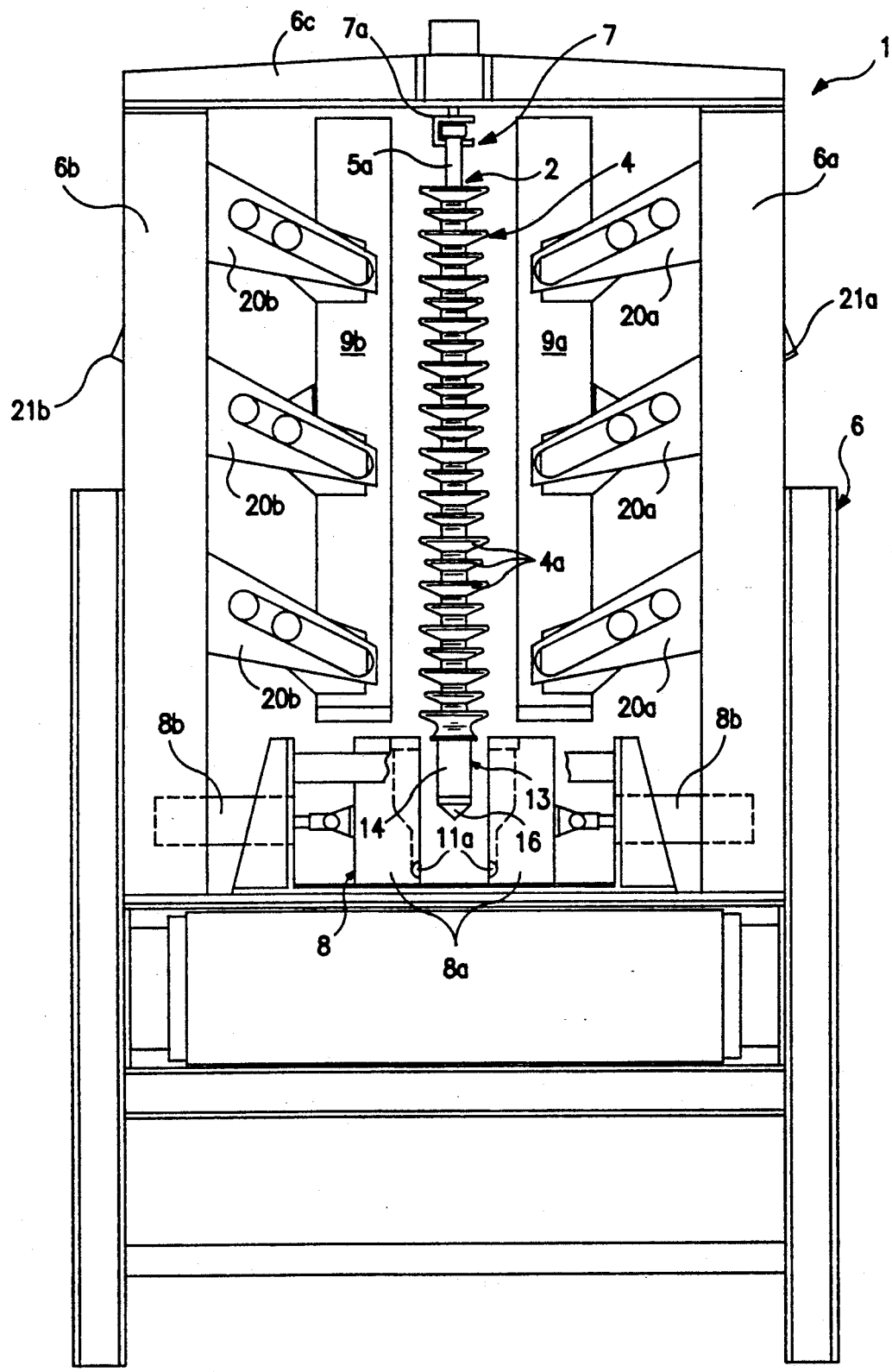
FIG. 2 represents the apparatus of FIG. 1 showing the mould halves in the open position.
Figure 3:
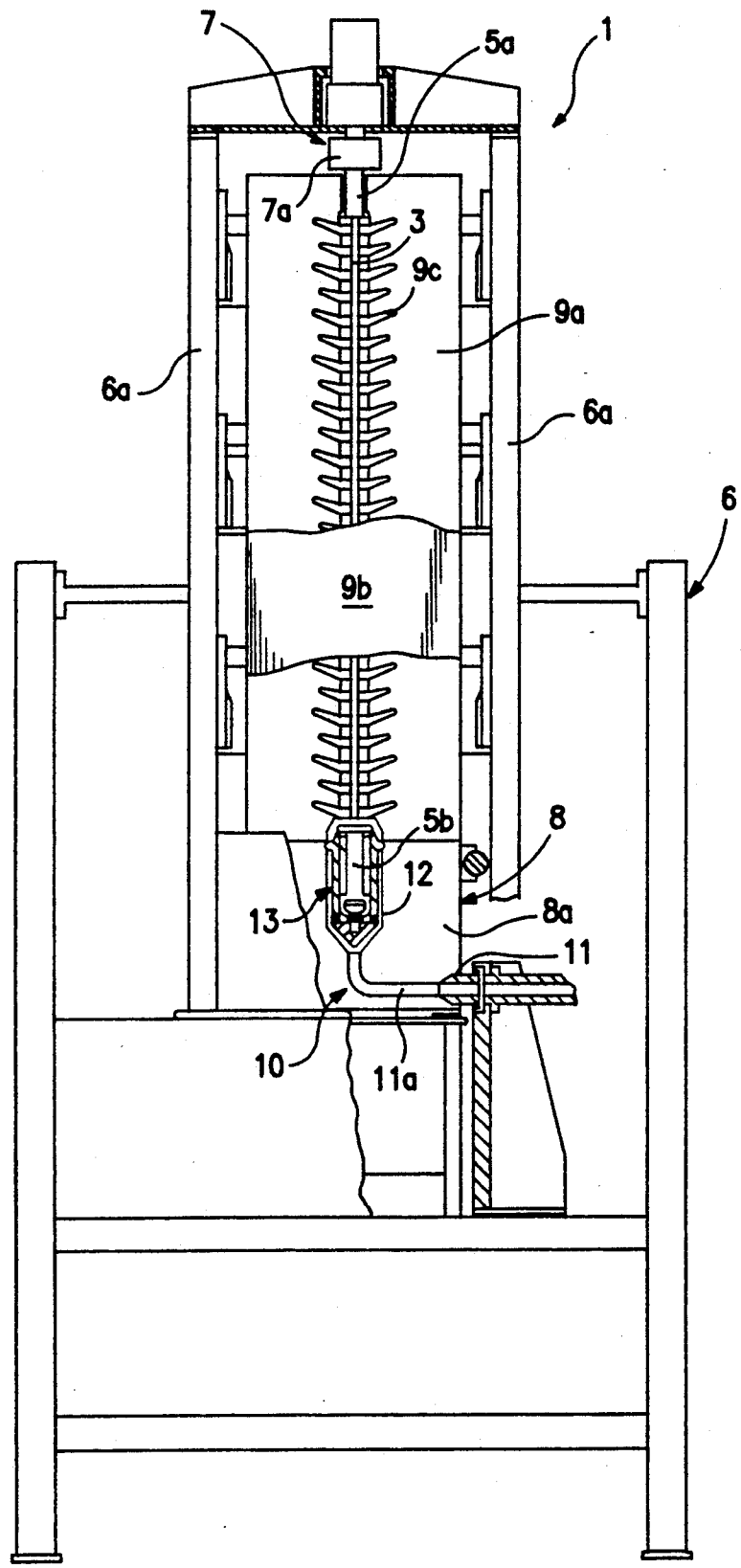
FIG. 3 is a partly sectional, side view of the apparatus shown in FIGS. 1 and 2.

As shown in FIGS. 1, 2 and 3, an apparatus to make composite insulators for electric overhead lines in accordance with the present invention has been generally identified by reference numeral 1.

Figure 6:
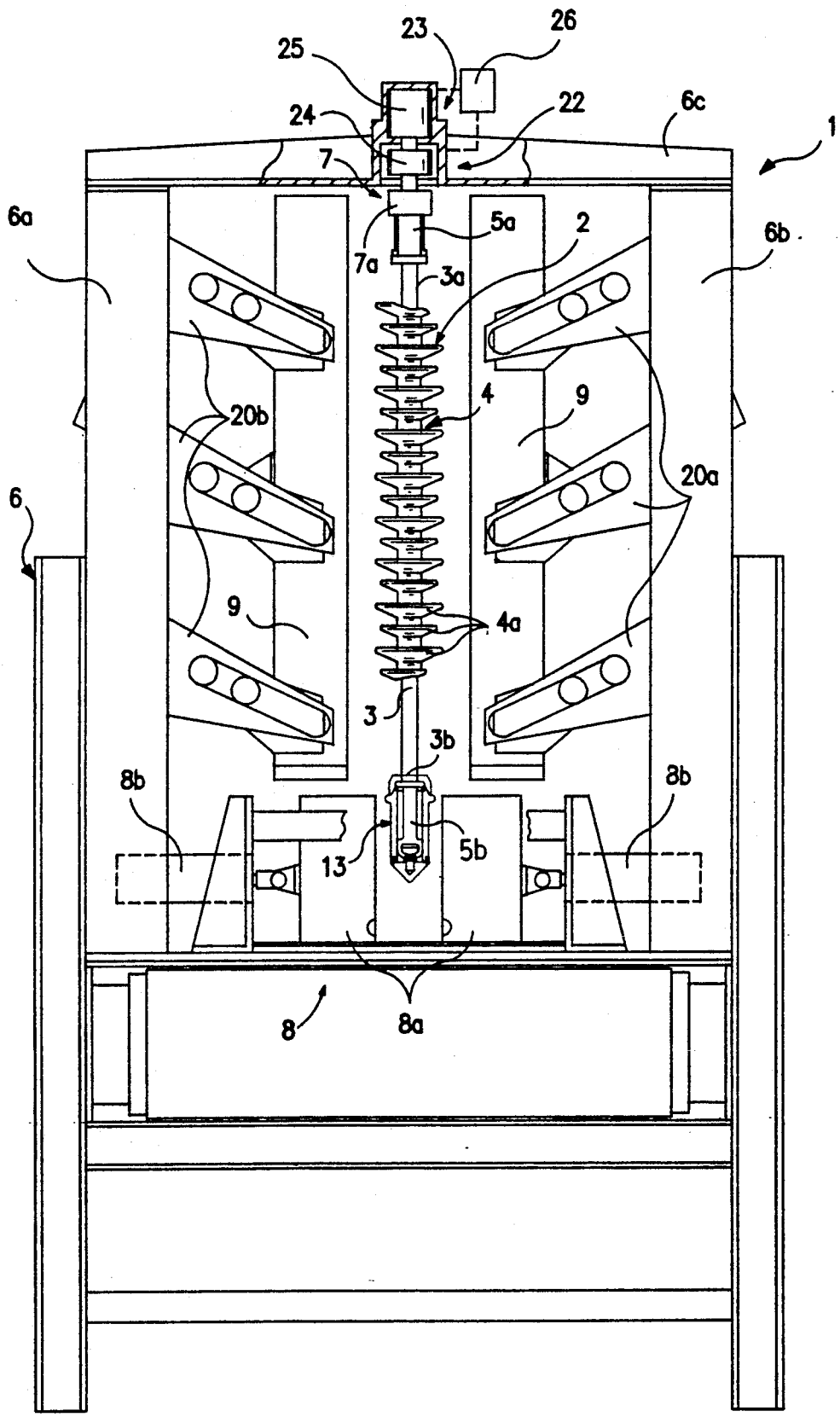
FIG. 6 is a partly sectional, front view of the apparatus of FIG. 5, showing the mould halves in the closed position.

Apparatus 1 is designed to make insulators 2 (FIG. 2), each of which comprises a cylindrical central core 3 (FIGS. 3 and 4) of elongated form, generally made of polymeric resin reinforced with fibre glass or the like, exhibiting a first and a second end 3a and 3b (FIG. 6).

Associated with the first and second ends 3a and 3b is a first and a second end piece 5a and 5b respectively, which pieces are fixedly integral therewith and are designed to be used for engaging the insulator 2 between an electric conductor and a supporting pylon, when said insulators are mounted on an electric overhead line (not shown).

Applied to the central core 3, as more clearly described in the following, is an outer coating 4 of elastomeric material provided with a plurality of annular projections 4a (FIG. 2) distributed along the longitudinal extension of the central core itself; the outer coating has the function of protecting the core from moisture and polluting agents, in order to maintain the electric features thereof, whereas the annular projections, well known in the field, are arranged and shaped so as to reduce the possibility of surface discharges along the insulator between the conductor and pylon.

Apparatus 1 comprises a base structure 6 mainly consisting of two pairs of upright posts 6a and 6b joined to each other at the top by an upper crosspiece 6c.

The central core 3 is held in the desired position by first and second clamping means 7, 8 engaging it close to the first and second end pieces 5a, 5b respectively.

More particularly, the first clamping means 7 substantially comprises a bracket 7a fastened to the centre line of the crosspiece 6c and engaging the first end piece 5a.

The second clamping means 8 in turn comprises a pair of injection mould halves 8a slidably guided in the lower part of the base structure 6 and movable, upon command of respective actuators 8b, between an open position in which they are spaced apart from each other (FIG. 2) to a closed position in which they are pressed against each other (FIG. 3) so as to engage the second end piece 5b (FIG. 3), as further described in the following.

Slidably engaged with the posts 6a and 6b through respective slides 20a, 20b, are two forming mould halves 9a and 9b. These mould halves 9a, 9b too are movable, through respective actuators 21a, 21b, between an open position, in which they are spaced apart from each other and from the central core 3 by the same distance (FIG. 2), and a closed position in which they are disposed close to each other in order to define, coaxially around the core itself, a filling chamber 9c the shape of which conforms to the outer shape of the insulator 2.

Figure 4:
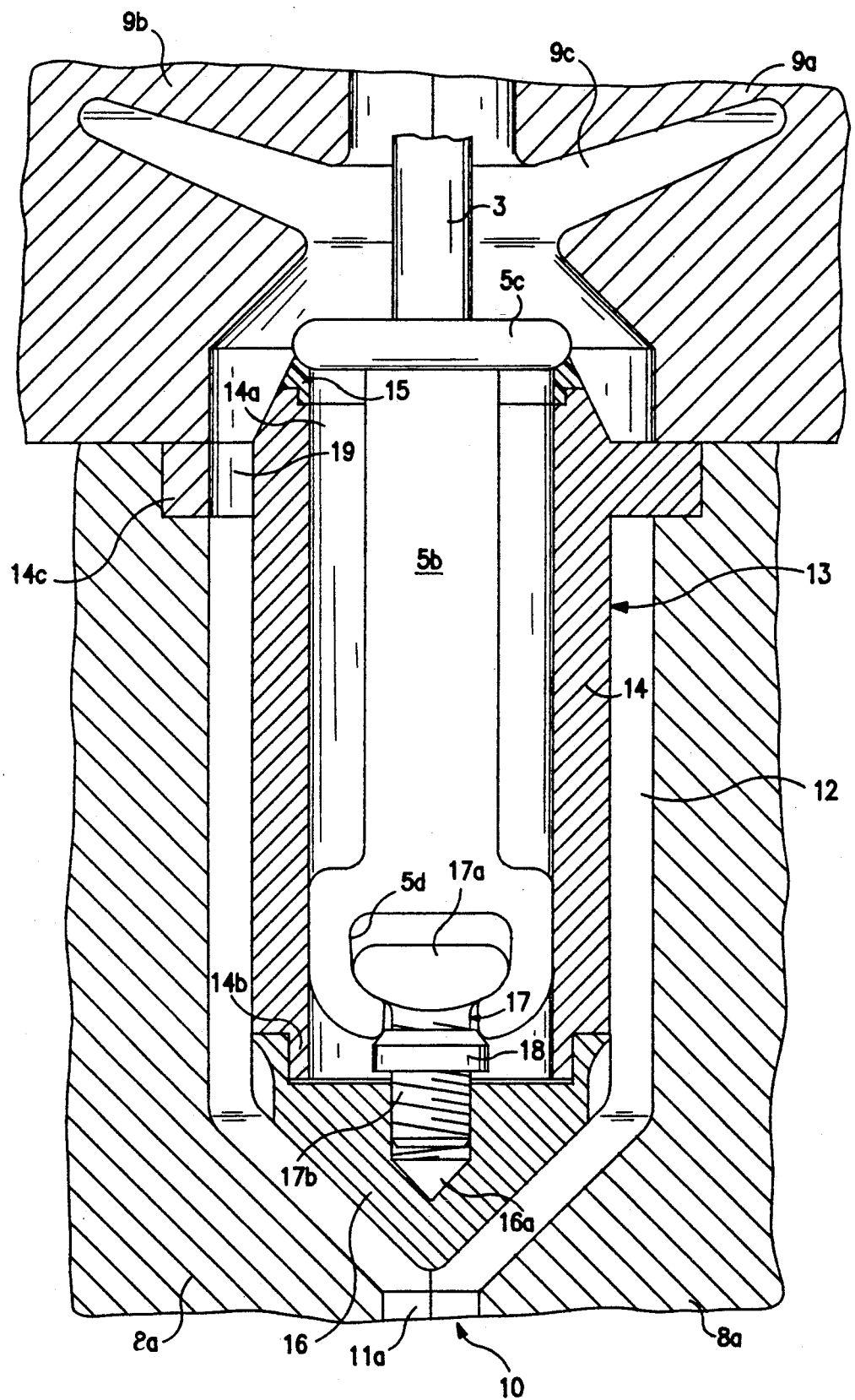
FIG. 4 is an enlarged sectional view particularly showing a sleeve belonging to the injection means.

Preferably, as viewed from FIGS. 1, 3 and 4, in the closed position the forming mould halves 9a, 9b act in abutment on the injection mould halves 8a.

Injection means 10 is associated with the injection mould halves 8a and in accordance with the invention is arranged to carry out the introduction of a predetermined amount of elastomeric material into said filling chamber 9c in a direction coaxial to the central core 3.

This injection means 10 mainly comprises a nozzle 11 (FIG. 3) fed with elastomeric material coming from an extruder for example, and designed to be removably engaged to a canalization 11a formed between the injection mould halves 8a. The canalization 11a opens into a conveying hollow space 12 (FIGS. 3 and 4) defined between the injection mould halves 8a and a containing sleeve 13 disposed coaxially to the second end piece 5b of the central core 3.

Conveniently at least the end portion of the canalization 11 contiguous to the hollow space 12 is rectilinear and coaxial with the hollow space 12 and central core 3.

Several canalizations 11a can also be provided for conducting the injected elastomeric material to the hollow space 12, in this case these canalizations in accordance with the invention are disposed symmetrically to the axis of the insulator core.

In greater detail, the containing sleeve 13 (FIG. 4) has a hollow cylindrical body 14 designed to accommodate the second end piece 5b of the central core which is insertable in the sleeve as far as an annular shoulder 5c thereof is brought in abutment against the inlet 14c of the cylindrical body itself.

Preferably, interposed between the cylindrical body inlet 14a and the annular shoulder 5c is a sealing ring 15.

A pointed piece or ogive 16 is coaxially mounted to the end 14b of the cylindrical body 14 opposite the inlet 14a and a shank 17b of a threaded member 17 is engaged thereinto through a threaded blind hole 16a. Said threaded member 17 is also provided with a head 17a adapted to be operatively received in an undercut housing 5d conventionally provided on the second end piece 5b of the central core.

A threaded stop ring 18 is also operatively engaged with the shank 17b of the threaded member 17 and it is arranged to act in abutment on the second end piece 5b of the insulator core in order to firmly clamp the head 17a in the undercut housing 5d of the second end piece.

An annular flange 14c radially extending towards the outside is provided close to the cylindrical body inlet 14a and, as shown in FIG. 4, it can be engaged between the injection mould halves 8a and the forming mould halves 9a and 9b in the closed position so as to cause the clamping of the sleeve 13 and consequently of the second end piece 5b.

In addition the annular flange 14c is provided with several through openings 19, circumferentially distributed and spaced apart from each other by the same distance. Said openings, only one of which is shown in FIG. 4, are intended to bring the conveying hollow space 12 into communication with the filling chamber 9c.

Operation of apparatus 1 described above mainly as regards structure, is as follows.

First the central core 3 of the insulator to be formed is subjected to a preliminary preparation involving the engagement of the threaded member head 17a in the undercut housing 5d of the second end piece 5b and the subsequent clamping to position of the threaded member itself by locking the threaded stop ring 18 against the second end piece 5b.

At this point the second end piece 5b is housed within the containing sleeve 13 so that the annular shoulder 5c thereof acts by contact on the sealing ring 15 associated with the cylindrical body inlet 14a.

Then the ogive 16 is engaged with the end 14b of the cylindrical body 14 by its being screwed down on the threaded member 17.

By the above screwing, the tight locking of the ogive 16 and annular shoulder 5c against the end 14b of the cylindrical body 14 and the sealing ring 15 respectively is achieved, thereby preventing the elastomeric covering material that will be subsequently injected from coming into contact with the end piece 5b.

At this point the central core 3 is disposed in the apparatus 1 which has the injection mould halves 8a and forming mould halves 9a and 9b in the completely open position.

More particularly, the first end piece 5a is engaged with the bracket 7a and afterwards the sleeve 13 containing the second end piece 5b is engaged between the injection mould halves 8a as a result of the translation of the latter to the closed position by means of actuators 8b.

The closure of the injection mould halves 8a also brings about the formation of the conveying hollow space 12 around the sleeve 13 and the canalization 11a connecting the hollow space to the nozzle 11.

In the same manner, the subsequent closure of the forming mould halves 9a and 9b defines the filling chamber 9c around the central core 3 corresponding to the outer insulator shape.

Then the elastomeric material is injected through the nozzle 11 into the canalization 11a and the conveying hollow space 12. Through the openings 19 provided in the annular flange 14c, the elastomeric material in the plastic state flows into the filling chamber 9c causing the complete filling of the same.

The introduction of the elastomeric material into the filling chamber 9c takes place through passages 12 and 19 feeding the elastomeric material onto the central core. Said passages extend in a direction parallel to the axis of the central core 3 and in symmetrical axial planes.

By virtue of the geometrical configuration of the conveying hollow space 12 and openings 19, during this step the thrust action exerted on the elastomeric material involves forces oriented parallel to the insulator axis, and the axial symmetry of the passage sections of the material along the whole insulator axis avoids the occurrence of radial pressure disequilibriums on the insulator core.

When the filling has been completed, the elastomeric material is submitted to a cross-linking process through heating of the forming mould halves 9a, 9b and optionally the injection mould halves 8a.

The established time for the cross-linking of the elastomeric material being elapsed, the forming mould halves 9a, 9b are brought to the open position so as to free the outer coating 4 formed around the central core 3.

This operation is followed by the mutual moving apart of the injection moulds 8a which brings about the disengagement of the containing sleeve 13, making it possible to remove the insulator 2 upon disengagement of the first end piece 5a from the bracket 7a.

At this time, the containing sleeve 13 will be incorporated into the moulding riser consisting of the possible elastomeric material cross-liked at the inside of the conveying hollow space 12, the canalization 11a and the through opening 19 provided in the annular crown 14c. Therefore, in order to make it possible to disengage the sleeve 13 from the finished insulator 2, it will be sufficient to separate the riser from the outer coating 4 by a mere cutting operation carried out radially at the height of the annular shoulder 5c.

By rotating the whole sleeve 13, said sleeve will be disengaged from the second end piece 5b of the insulator core, as a result of the untightening of the ogive 16 from the threaded element 17. The threaded member is then removed from the second end piece 5b and the sleeve 13 will be afterwards cleared of the riser for reuse.

Since the elastomeric material is introduced into the filling chamber 9c by means of thrust forces parallel to the core axis, the apparatus of the invention is adapted to manufacture composite insulators without involving risks of axial deflections on the central core, by the effect of radial thrusts asymmetrically exerted by the injected material. Actually, during the progressive filling of the die of the insulator coating the elastomeric material in the fluid state flows in a substantially axial direction along the whole length of the insulator, and there are no asymmetric flow deflections or other perturbations that, in connection with the rheologic features of the material, could give rise to localised pressure increases on the central core, thereby bringing about asymmetric thrusts and deflections of the core itself.

Figure 5:
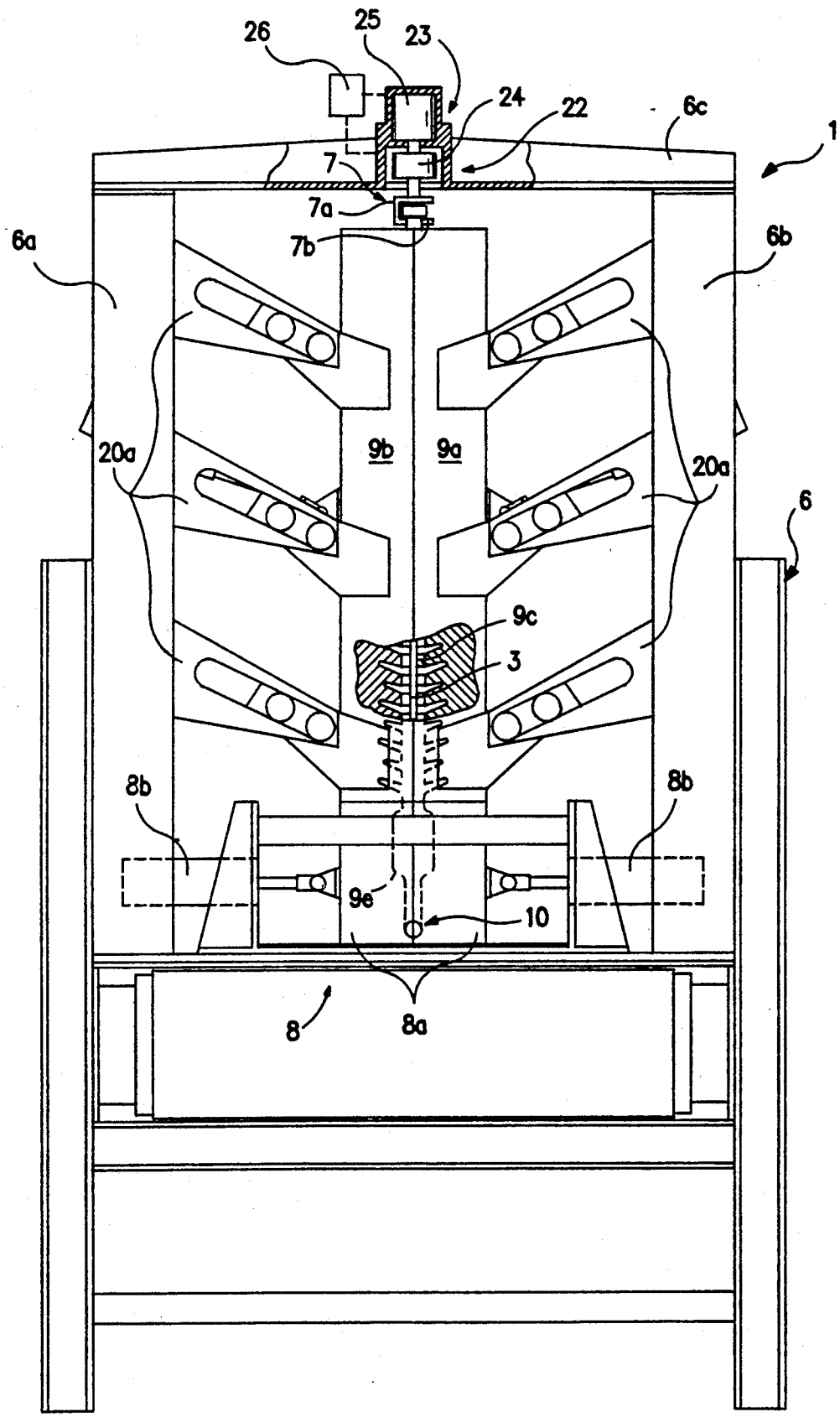
FIG. 5 is a partly sectional, front view of the moulding apparatus of FIG. 1, showing the respective mould halves in a closed position and showing the tension means designed to apply axial mechanical tractive actions to the central core of the insulator in the mould.

FIGS. 5 and 6 show an apparatus to make composite insulators for electric overhead lines in accordance with a preferred embodiment of the present invention.

In this construction, the first clamping means 7, as already described, comprises a bracket 7a mounted close to the centre line of the crosspiece 6c.

The bracket 7a has a fork-shaped portion 7b engaging with the first end piece 5a of the core 3, holding it at least axially.

The second clamping means 8 in turn comprises a pair of injection mould halves 8a slidably guided in the lower part of the base structure 6 and movable, upon the action of fluid-operated cylinders 8b, between an open position in which they are spaced apart from each other (FIG. 6) and a closed position in which they are pressed against each other (FIG. 5) for engaging the second end piece 5b.

Slidably engaged with the base structure 6 and more particularly to the posts 6a and 6b through respective facing slide guides 20a, 20b, is a pair of forming mould halves 9a and 9b.

The forming mould halves 9a, 9b too are movable between an open position, in which they are spaced apart from each other and from the central core 3 by the same distance (FIG. 6), and a closed position (FIG. 5) in which they are disposed close to each other in order to define a filling chamber 9c the shape of which conforms to the outer shape of the insulator 3, around the core itself and coaxially therewith.

Injection means 10 is associated with apparatus 1. Said injection means is adapted to carry out the introduction of a predetermined amount of elastomeric material to the plastic state into the filling chamber 9c in order to accomplish the complete filling of said housing, as above described.

In accordance with the present invention, between at least the first clamping means 7 and the base structure 6 provision is made for the interposition of metering means 22, designed to detect possible variations in the axial tensile state of the central core 3 during the insulator manufacturing step, as well as tension means 23 designed to apply axial mechanical tractive actions to the central core 3, as more clearly described in the following.

In greater detail, in the embodiment shown, the metering means 22 comprises a load cell 24 operatively engaged between the bracket 7a and the base structure 6 and said tension means 23 comprises a fluid-operated actuator 25 fastened to the crosspiece 6a and acting on the bracket 7a through the load cell 24.

In accordance with the concerned process, operation of apparatus 1 is as follows.

The central core 3 is first fastened to the first and second clamping means 7 and 8.

More particularly, the first end piece 5a associated with the first core end 3a is fitted to the bracket 7a and the second end piece 5b associated with the second core end 3b is closed between the injection mould halves 8a moved from the open to the closed position.

To the ends of the present invention, it is important that the engagement of the core by the first and second clamping means 7, 8 should take place in the absence of end play. Preferably, after the injection mould halves 8a have been closed, the central core 3 is submitted to a starting pretensioning of a predetermined value upon the action of the fluid-operated actuator 25. The value of the starting pretensioning can advantageously be controlled by the load cell 24.

Subsequently, the two forming mould halves 9a, 9b, by sliding on the guides 20a and 20b, are moved from the open position to the closed position, thereby being brought into contact with each other so as to define the filling chamber 9c around the central core 3.

Then, through the previously mentioned injection means an amount of elastomeric material to the plastic state begins to be introduced under pressure into the filling chamber 9c. During this injection step the elastomeric material under pressure exerts thrust forces on the central core 3 that for several reasons may be unbalanced at the geometrical axis of the core, even in the presence of axial injection.

As a result, in the presence of disequilibrium between the pressure forces exerted by the elastomeric material, the central core 3 can be submitted to an overall force in the transverse direction tending to deflect it from the starting rectilinear configuration.

Should the central core 3 remain deflected during the cross-linking step, thickness variations would be found on the outer coating 4 of the insulator 2 which variations, where of importance, could cause a decay in the electric and insulating properties of the coating, in particular reducing the insulator resistance to aggressive or polluting environments.

In accordance with the present invention, it was found that the core deflections occurring during the injection generate variations in the axial tension state of the core that, depending upon the cases, can result in increases or decreases in the mechanical tension detected at the end pieces 5a, 5b, which increases and decreases are detected by the load cell 24.

This cell therefore operates the activation of the fluid-operated actuator 25, through control means 26, for example of the electronic type.

In greater detail, the fluid-operated actuator 25 is activated so as to apply an additional mechanical tensile action of predetermined value coaxially to the core 3; this tensile action counteracts the side deflection of the core and restores the starting rectilinear configuration of the same.

Preferably, the additional tensile force is held as far as the load cell 24 detects that the core tensioning variation due to the deflection stress thereon has reached and maintained a constant value over at least a predetermined time.

Alternatively, the additional tensile force can last for a previously input time beginning from the moment at which the actuator 25 intervention has been operated. At the end of the input time, the actuator itself will eliminate the additional tensile action restoring the initial pre-tensioning state of the core 3.

Obviously, the application of the additional mechanical tensile action can be repeated during the injection step each time a tensioning variation in the central core 3 due to the occurrence of side deflections in the core itself is detected.

In accordance with another possible embodiment of the process of the invention, the additional mechanical tensile action can be maintained until the end of the injection step. In this case there will be an additional mechanical tensile action at each tensioning variation in the core 3 caused be deflection stresses and the effects of said additional tensile action are going to be added to the effects produced by the additional tensile actions that may have been previously applied.

When the filling of chamber 9c has been completed, the elastomeric material is conventionally submitted to a cross-linking process by heating the forming mould halves 9a, 9b and preferably the additional mechanical tensile action exerted on the central core 3 is released or reduced to a lower value.

When the cross-linking step is over, the forming mould halves 9a, 9b will move from the closed position to the open position in order to free the insulator having the outer coating 4 formed around the central core 3.

The last-mentioned operation is followed by the displacement of the injection mould halves 8a which brings about the disengagement of the second end piece 5b so that the finished insulator 2 can be removed upon disengagement of the first end piece 5a from the bracket 7a.

The means 10 for injecting the elastomeric material into the chamber 9c preferably, is so arranged as to feed the material substantially in an axial direction along the core, starting from one of the ends thereof, for example following the path 9e diagrammatically shown in dotted lines in FIG. 5; this enables the thrusts on the core due to the injected material to become substantially axially balanced, so that the forces tending to deform the core due for example to the lack of homogeneity in the injected material viscosity or the like will be at all events of small value.

Under these conditions, an axial tensile action on the core sufficient to lead the core again to the rectilinear configuration will be in turn of reduced value and therefore, will not cause an elastic elongation of the core capable of impairing the efficiency of the finished insulator.

Preferably, the axial tensile action imposed by the actuator 25 is included between 5 and 10 times the absolute value of the detected load variation and it is at all events lower than a maximum value equal to 1/10 of the ultimate tensile stress of the core itself and preferably lower than a value corresponding to a core elongation of 1 per thousand.

The overall axial tensile load remaining in the core at the end of the injection step of the elastomeric material and held during the cross-linking step is preferably lower than 1/20 of the ultimate tensile stress of the core and more preferably, lower than the load corresponding to 0.5 per thousand of elastic elongation of the core itself, so as not to leave an important state of inner elastic tension in the insulator after the moulding, susceptible of impairing the adhesion of the coating to the core or causing deformations in the assembly.

The process and apparatus of the invention, due to the detection of the occurrence of a core deflection by means of the load cell 24 and to the application of a tensile stress by the actuator 25, lend themselves to produce composite insulators without involving risks of side deflections in the core resulting from thrusts exerted by the elastomeric material during the injection step, as well as consequent irregularities in the coating thickness.

Therefore, in a single moulding and cross-linking step it is possible to produce composite insulators even of important length without resorting to the use of retractable rods for locking the axial positioning of the core during the injection step or even to more complicated processes, according to the known art.

It is understood that many modifications and variations can be made to the invention as conceived, all of them falling within the scope of the inventive idea.

We claim:

1. A process for making a composite insulator for electric overhead lines, in which said insulator comprises a central core (3) of composite material provided with an outer coating (4) of elastomeric material and comprises a first and a second end pieces (5a, 5b) associated with a first and a second end (3a, 3b) of said core (3) and externally protruding from the coating (4) of elastomeric material, said process comprising the following steps:

supporting the central core (3) by the engagement of said first and second end pieces (5a, 5b);

enclosing said core (3) between at least two forming mould halves (9a, 9b) movable between an open position in which they are spaced apart from each other and a closed position in which they define a filling chamber (9c) around the core the shape of which conforms to the shape of the outer insulator coating (4);

injecting an amount of elastomeric material in the plastic state into said filling chamber (9c) sufficient to cause the complete filling of said chamber;

causing the cross-linking of the elastomeric material injected into said filling chamber (9c);

moving said forming mould halves (9a, 9b) away from the insulator (2) bringing them from the closed position to the open position, characterized in that, during the injection step and before the cross-linking step, the following further steps are provided:

detecting variations in the axial tension of the central core (3) as a result of deformations of the core itself due to side deflection; and applying an additional tensile load to a predetermined value to the core (3) each time one of said tension variations occurs.

2. A process according to claim 1, characterized in that, before the injection step, the central core (3) is pretensioned, the amount of the pretensioning being at least adapted to reduce the mounting plays to zero.

3. A process according to claim 1, characterized in that the additional tensile load is maintained until the tensile value resulting therefrom remains at a constant value at least over a predetermined time.

4. A process according to claim 1, characterized in that the additional tensile load remains for a predetermined time.

5. A process according to claim 1, characterized in that the additional tensile load is maintained until the end of the injection step of the elastomeric material forming the outer insulator coating (4).

6. A process according to claim 1, characterized in that the additional tensile load is lower than a value equal to 1/10 of the ultimate tensile stress of the core.

7. A process according to claim 6, characterized in that the maximum additional tensile load applied to the core (3) is lower than a value corresponding to an elongation of 1 per thousand of the core itself.

8. A process according to claim 6, characterized in that the maximum additional tensile load applied to the core (3) is included between 5 and 10 times the absolute value of the detected variation in the axial tension.

9. A process according to claim 1, characterized in that the additional tensile load is reduced substantially to zero before the beginning of the cross-linking step.

10. A process according to claim 1, characterized in that the overall residual tensile load maintained on the core (3) during the cross-linking step is lower than a value equal to 1/20 of the tensile stress of the core.

11. A process according to claim 1, characterized in that, the overall residual tensile load maintained in the core (3) during the cross-linking step is lower than a value corresponding to an elongation of 0.5 per thousand of the core.

12. An apparatus for making composite elongate insulators for electric overhead lines, in which each of said insulators comprises a central core (3) of composite material having secured thereto, at opposite ends, a first and a second end pieces (5a, 5b), as well as a core coating (4) made of elastomeric material encircling said core and provided with longitudinally-distributed annular projections (4a) disposed in coaxial relation with the core (3), said apparatus comprising:
 a base structure (6);
 first clamping means (7) to engage and laterally and axially support said first end piece (5a);
 second clamping means (8) to engage and laterally and axially support the second end piece (5b);
 at least two forming mould halves (9a, 9b), slidably guided relative to the base structure (6) and movable between an open position in which they are spaced apart from each other and a closed position in which they define a filling chamber (9c) around the core (3), the shape of said filling chamber matching the outer shape of said insulator (2),
 characterized in that at least one of said clamping means (5a) is movable in the direction axially of said core (3) when said mould halves (9a, 9b) are moved to the closed position, and said apparatus comprises variable tensioning means connected to and acting between said one of said clamping means (5a) and said base structure (6) for applying axial tension to said one of said clamping means (5a) and hence, to said central core (3) and injection means (10) for introducing an amount of elastomeric material into said filling chamber (9c), which injection means consists of passages (12, 19) extending in an axially symmetrical direction parallel to the axis of the central core (3) for feeding the elastomeric material onto said central core, one of said passages (12) having an opening remote from an end (3b) of said core (3) for receiving said elastomeric material and the other of said passages (19) communicating with said one of said passages (12) and with said filling chamber (9c) whereby the tensile action of the elastomeric material on the core is reduced to the minimum so that any elastic elongations of said core, capable of impairing the efficiency of the finished insulator, is avoided.

13. An apparatus according to claim 12, characterized in that said second clamping means (8) comprises a containing sleeve (13) encircling and fastened to said second end piece (5b) and adapted to be firmly engaged by said second clamping means, said one of said passages (12) encircling said sleeve (13) and being intermediate said sleeve (13) and said second clamping means and said injection means (10) comprises an injection nozzle (11) fed with said elastomeric material and communicating with said one of said passages (12).

14. An apparatus according to claim 13, characterized in that said containing sleeve (13) is separable from said second clamping means (8) and has an annular flange (14c) radially protruding radially outwardly of the sleeve and adapted to be engaged by said second clamping means (8) in order to cause the fastening of the sleeve (13) and the second end piece (5b) to said second clamping means (8), said flange (14c) having a plurality of said passages (19) extending therethrough and circumferentially spaced with respect to each other to bring said one of said passages (12) into communication with the filling chamber (9c), said passages (19) being axially symmetrical.

15. An apparatus according to claim 14, characterized in that said containing sleeve (13) has an inlet (14a) said second end piece (5b) has an annular shoulder (5c) and there is a sealing ring 15 engaging said inlet (14a) and engaged with said annular shoulder (5c) so as to sealingly close said inlet (14a).

16. An apparatus according to claim 12, characterized in that said first clamping means (7) comprises a support bracket (7a) adapted to engage the first end piece (5a) of said central core (3).

17. An apparatus according to claim 12, characterized in that said second clamping means (8) comprises at least two injection mould halves (8a) movable between an open position in which they are spaced apart from each other and a closed position in which they are located close to each other in order to fix the position of the second end piece (5b).

18. An apparatus according to claim 17, characterized in that an injection nozzle (11) is connected to said filling chamber (9c) by at least a canalization (11a) in the second clamping means (8).

19. An apparatus according to claim 18, characterized in that said canalization (11a) has at least a portion which is contiguous to said opening in said one of said passages (12) and which is axially symmetrical to, and in coaxial relation with the axis of the central core (3).

20. An apparatus according to claim 18, characterized in that said second clamping means comprises a containing sleeve (13) which can be rigidly and removably engaged between said forming mould halves (9a, 9b) and said injection mould halves (8a) in the closed position of the forming mould halves and the injection mould halves.

21. An apparatus for making a composite insulator for electric overhead lines, in which said insulator (2) comprises a central core (3) made of composite material, provided with an outer coating (4) of elastomeric material and having secured thereto a first and a second end pieces (5a, 5b) associated with a first and a second end (3a, 3b) respectively of said core (3), said coating (4) having longitudinally distributed annular projections (4a), said apparatus comprising:
 a base structure (6);
 first clamping means (7) to engage and support said first end piece (5a);
 second clamping means (8) to engage the second end piece (5b);

at least two forming mould halves (9a, 9b), slidably guided relative to the base structure (6) and movable between an open position in which they are spaced apart from each other and a closed position in which they define a filling chamber (9c) around the core (3), the shape of said chamber matching the outer shape of said insulator coating (2);

injection means for introducing an amount of elastomeric material in the plastic state into said filling chamber (9c), in order to carry out the complete filling of said housing, characterized in that it further comprises metering means (22) connected in series between the central core (3) and the base structure (6), adapted to detect variations in the axial tensile state of the core;

tension means (23) connected to and axially acting on the central core and adapted to apply a mechanical tensile action to said central core (3);

drive and control means (26) acting on said tension means and responsive to said metering means (22) for controlling the operation of the tension means in response to the detection of said variations in the axial tensile state of the core.

22. An apparatus according to claim 21, characterized in that said tension means (23) comprises a fluid-operated actuator (25) engaged with the base structure (6) and acting on said first clamping means (17).

23. An apparatus according to claim 21, characterized in that said first clamping means (7) comprises a bracket (7a) having a fork-shaped portion (7b) into which the first end piece (5a) of the central core (3) is engaged.

24. An apparatus according to claim 21, characterized in that said second clamping means (8) comprises at least two injection mould halves (8a) movable between an open position in which they are spaced apart from each other and a closed position in which they are disposed close to each other.

25. An apparatus according to claim 21, characterized in that said drive and control means (26) comprises an automatic processing unit for driving said tension means and providing a tensile load on the core, the value of said tensile load corresponding to the detected variation in the tensile state of the core itself, based on a predetermined correlation.

26. An apparatus to make a composite insulator for electric overhead lines, said insulator comprising a central core (3) of composite material having, on opposite ends, a first end piece (5a) and a second end piece (5b) and having an encircling core coating (4) made of elastomeric material provided with longitudinally-distributed annular projections (4a) disposed in coaxial relation with the core (3), said apparatus comprising:

a base structure (6);

first clamping means (7) to engage and support said first end piece (5a);

second clamping means (8) to engage said second end piece (5b);

at least two forming mould halves (9a, 9b), slidably guided relative to the base structure (6) and movable between an open position in which the mould halves are spaced apart from each other and a closed position in which the mould halves define a filling chamber (9c) around the core (3), the shape of said chamber matching the outer shape of said insulator (2); and injection means (10) for introducing an amount of elastomeric material into said filling chamber (9c), characterized in that, said injection means comprises at least one passage (19) disposed in spaced relation to the axis of said core and extending in the axial direction of, and parallel to, the axis of the central core (3) for feeding the elastomeric material onto said central core (3) axially of said central core (3), said second clamping means (8) comprising an outer portion (8a) encircling a containing sleeve (13) co-axial with the axis of said core, said outer portion (8a) and said containing sleeve (13) defining a conveying hollow space (12) therebetween which is co-axial with said axis of said core and which has a first end adjacent said filling chamber (9c), and said containing sleeve (13) being cylindrical, having a bore for receiving said second end piece (5b) and having a first end with an opening (14a) adjacent said filling chamber (9c) and an opposite, second end (14b), said first end having an annular flange (14c) extending radially outwardly and engageable by said second clamping means (8) for clamping of said containing sleeve (13) by said second clamping means (8), said annular flange (14c) covering said conveying hollow space (12) at said first end adjacent said filling chamber (9c) and having said passages (19) therein for permitting elastomeric material to flow from said conveying hollow space (12) into said filling chamber (9c), said second ned piece (5b) having an annular shoulder (5c) engageable with said first end of said containing sleeve (13) for closing said opening (14a) at said first end, a tapered closure piece (16) engaging said second end (14b) of said containing sleeve (13) and closing said bore at the said second end (14b), a threaded member (17) having a head (17a) engageable with said second end piece (5b) and having threads (17b) engaging said closure piece (16) for pulling said annular shoulder (5c) against said first end of said conveying hollow space (12) and for pressing said closure piece (16) against said second end (14b) of said containing sleeve (13), whereby movement of said second end piece (5b) and said core (3) with respect to said containing sleeve (13) is prevented, and said injection means comprising an injection nozzle (11) adjacent said second, opposite end of said conveying hollow space (12) for injecting elastomeric material into said second, opposite end of said conveying hollow space (12).

27. An apparatus according to claim 26, characterized in that said second end piece (5b) has an undercut portion (5d) for receiving said head (17a) and further comprising a threaded stop ring (18) on said threads (17b) and acting on the second end piece (5b) so as to lock said head (17a) into said undercut portion (5d).

28. An apparatus to make a composite insulator for electric overhead lines, said insulator comprising a central core (3) of composite material having, on opposite ends, a first end piece (5a) and a second end piece (5b) and having an encircling core coating (4) made of elastomeric material provided with longitudinally-distributed annular projections (4a) disposed in coaxial relation with the core (3), said apparatus comprising;

a base structure (6);

first clamping means (7) to engage and support said first end piece (5a);

second clamping means (8) to engage the second end piece (5b);

at least two forming mould halves (9a, 9b), slidably guided relative to the base structure (6) and movable between an open position in which the mould halves are spaced apart from each other and a closed position in which the mould halves define a filling chamber (9c) around the core (3), the shape of said chamber matching the outer shape of said insulator (2); and injection means (10) for introducing an amount of elastomeric material in the plastic state into said filling chamber (9c) sufficient to fill such filling chamber (9c), characterized in that, said apparatus further comprises:

fluid activated tension means (23) mounted on said base structure (6) and having a fluid operated actuator (25) for applying axial tension to said core (3);

metering means (22) connected in series between said central core (3) and the base structure (6) for measuring variations in the axial tension on said core, said metering means (22) comprising a load cell (24) connected between said first clamping means (7) and said fluid operated actuator (25); and drive and control means (26) connected to said metering means (22) and responsive to said metering means (22) and connected to said tension means (23) for controlling the tension applied to said core (3) in response to variations in the axial tension on said core (3).

* * * * *

UNITED STATES PATENT AND TRADEMARK OFFICE
CERTIFICATE OF CORRECTION

PATENT NO. : 5,223,190
DATED : June 29, 1993
INVENTOR(S) : Vallauri et al

It is certified that error appears in the above-indentified patent and that said Letters Patent is hereby corrected as shown below:

Col. 1, line 12, after "2. Description of" insert --Related Art--;

Col. 3, line 17, change "an" to --a--;
line 65, after "said" insert --first--;
line 66, after "piece" insert --second clamping means to engage the second end piece;--;

Col. 7, line 12, after "12" change the comma (,) to a semi-colon (;);
line 16, after "5c" insert a comma (,);

Col. 8, line 17, after "Then" insert a comma (,);

UNITED STATES PATENT AND TRADEMARK OFFICE
CERTIFICATE OF CORRECTION

PATENT NO. : 5,223,190
DATED : June 29, 1993
INVENTOR(S) : Vallauri et al

It is certified that error appears in the above-indentified patent and that said Letters Patent is hereby corrected as shown below:

Col. 12, line 17, after "insulator" insert --(2)--;
        line 48, change "to" to --of--;

Col. 13, line 17, after "that" delete the comma (,);

Col. 15, line 29, change "(17)" to --7--;

Col. 16, line 31, change "ned" to --end--.

Signed and Sealed this

Fifth Day of April, 1994

BRUCE LEHMAN

Attest:

*Attesting Officer*     *Commissioner of Patents and Trademarks*